Aug. 6, 1957     C. KATWYK ET AL     2,801,492
FISH LURE CASE
Filed June 23, 1954
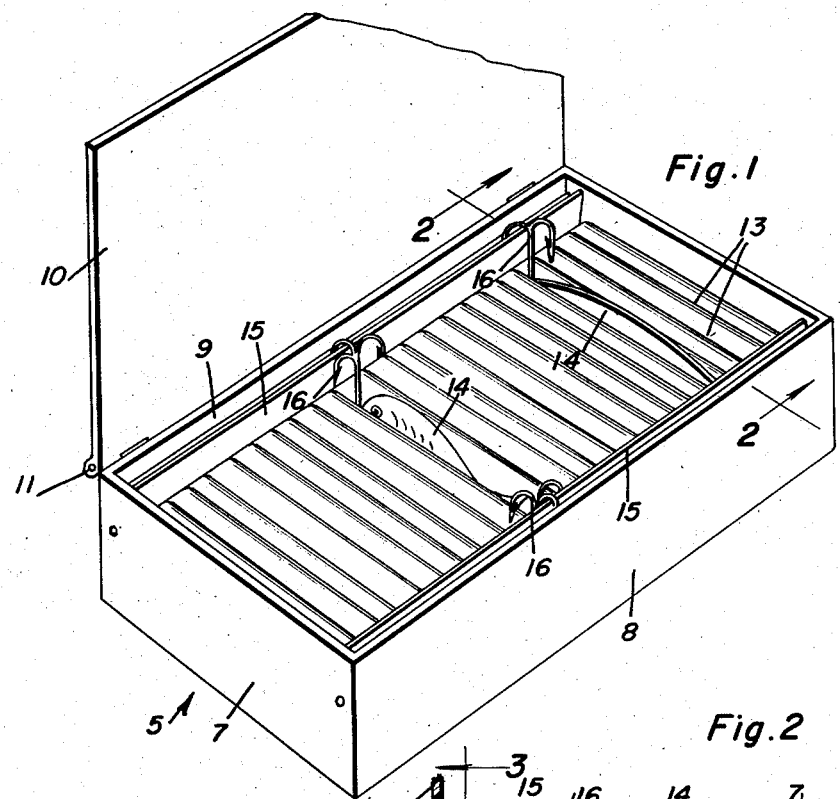
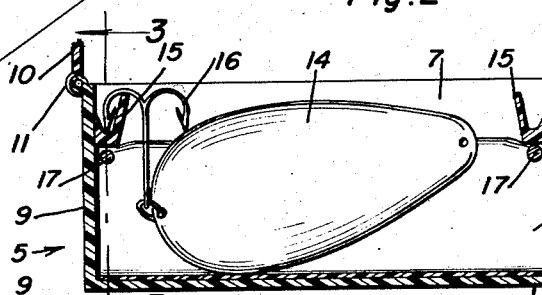
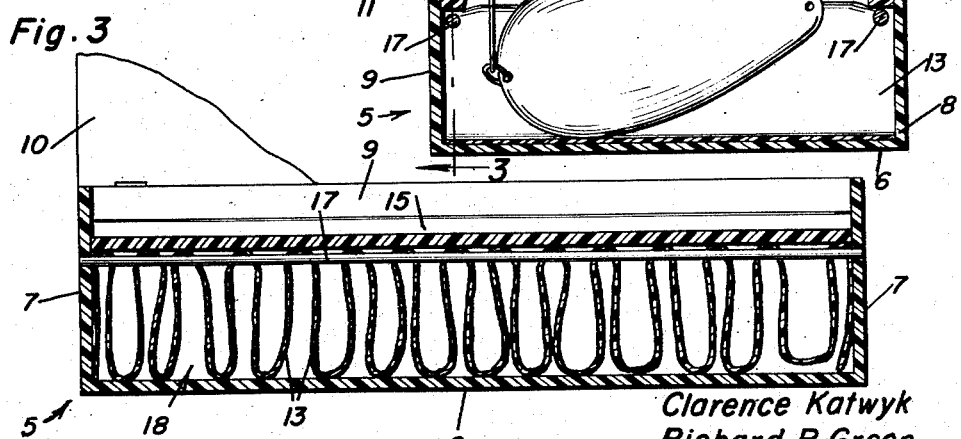
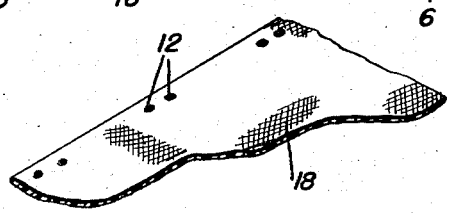
Clarence Katwyk
Richard R. Green
INVENTORS
BY *Clarence A. O'Brien*
*and Harvey B. Jacobson*
Attorneys

United States Patent Office 2,801,492
Patented Aug. 6, 1957

2,801,492
FISH LURE CASE

Clarence Katwyk and Richard R. Green,
Salt Lake City, Utah

Application June 23, 1954, Serial No. 438,778

1 Claim. (Cl. 43—54.5)

The present invention relates to new and useful improvements in fish lure cases and has for its primary object to provide, in a manner as hereinafter set forth, a device of this character which will readily accommodate a large number of lures but which will keep said lures separated from each other and protected against scratching or other damage.

Still another important object of the invention is to provide a lure case of the character set forth which embodies unique means for preventing the usual hooks from damaging the bodies of the lures.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view of a fish lure case constructed in accordance with the present invention, showing the cover in open position;

Figure 2 is a fragmentary vertical sectional view, taken substantially on the line 2—2 of Figure 1;

Figure 3 is a vertical sectional view, taken substantially on the line 3—3 of Figure 2; and Figure 4 is a fragmentary view in perspective, showing a portion of the flexible strip or sheet which forms the lure pockets.

Referring now to the drawing in detail, it will be seen that the embodiment of the invention which has been illustrated comprises a substantially rectangular box of suitable dimensions and material which is designated generally by the reference character 5. The box 5 includes a bottom 6, end walls 7, a front 8, a back 9 and a cover 10 hingedly mounted on said back 9, as at 11.

Extending between the end walls 7, adjacent the front and back 8 and 9 of the box 5, is a pair of longitudinal rods 17. Threaded for sliding adjustment on the rods 17 is an elongated sheet or strip 18 (see Figure 4) of suitable soft, flexible material. The sheet or strip 18 has formed in its longitudinal marginal portions spaced pairs of openings 12 through which the rods 17 are threaded. The construction and arrangement is such as to provide depending pockets 13 when the sheet 18 is threaded and gathered on the supporting rods 17 as shown in Figure 3.

The pockets 13 are for the reception of the lures, as at 14.

Mounted on the front and back 8 and 9, respectively, of the box 5 above the rods 17 and paralleling same, is a pair of substantially trough-shaped bars or racks 15 of suitable material. The usual hooks 16 of the lures 14 are engageable over the racks 15 to be anchored thereby.

In use, the lures 14 are slipped downwardly into the pockets 13 and the hooks 16 of said lures are engaged in the racks 15. To vary the capacity of the pockets 13 to readily accommodate various types, sizes or shapes of lures, the pleats or folds of the strip 18 may be readily slid along the supporting rods 17. When the cover 10 is closed, the hooks 16 are positively retained in the racks 15 by said cover. With the hooks 16 engaged in the bars or racks 15, said hooks are prevented from being dulled and from hooking the lures.

It is believed that the many advantages of a fish lure case constructed in accordance with the present invention will be readily understood and although a preferred embodiment of the device is as illustrated and described, it is to be understood that changes in the details of construction may be resorted to which will fall within the scope of the invention as claimed.

What is claimed is:

A case for fish lures of the type including spoons and hooks loosely mounted on one end thereof, said case comprising, in combination, a substantially rectangular box including a front and a back and open at its top for receiving the lures, flexible pockets suspended in the lower portion of the box and extending from the front to the back thereof for the reception of the spoons, troughs in the upper portion of the box mounted longitudinally on said front and back thereof for the reception of the hooks, said troughs traversing the end portions of the pockets and being adjacent to but spaced below the open top of the box, and a hinged cover on the box for closing same and for substantially closing the troughs for positively retaining the hooks therein.

References Cited in the file of this patent

UNITED STATES PATENTS

| | | |
|---|---|---|
| 231,969 | Perkins | Sept. 7, 1880 |
| 333,384 | Bray | Dec. 29, 1885 |
| 635,284 | Adair | Oct. 24, 1899 |
| 1,289,281 | Shaft | Dec. 31, 1918 |
| 1,883,134 | Walker et al. | Oct. 18, 1932 |
| 2,020,394 | Bates | Nov. 12, 1935 |
| 2,080,794 | Squassoni | May 18, 1937 |
| 2,118,474 | Morton | May 24, 1938 |
| 2,202,358 | Stone | May 28, 1940 |
| 2,235,369 | Heiner | Mar. 18, 1941 |
| 2,316,833 | Baron | Apr. 20, 1943 |
| 2,608,459 | Malmquist | Aug. 26, 1952 |
| 2,610,430 | Neiman | Sept. 16, 1952 |

FOREIGN PATENTS

| | | |
|---|---|---|
| 588,301 | Great Britain | May 20, 1947 |